US008918369B2

(12) United States Patent
Sanguinetti et al.

(10) Patent No.: US 8,918,369 B2
(45) Date of Patent: Dec. 23, 2014

(54) METHOD AND SYSTEM FOR CLASSIFICATION OF VENUE BY ANALYZING DATA FROM VENUE WEBSITE

(75) Inventors: Thomas V. Sanguinetti, La Jolla, CA (US); Dave T. Sanguinetti, La Jolla, CA (US); Jeffrey S. Ploetner, La Jolla, CA (US)

(73) Assignee: Craze, Inc., La Jolla, CA (US)

( * ) Notice: Subject to any disclaimer, the term of this patent is extended or adjusted under 35 U.S.C. 154(b) by 515 days.

(21) Appl. No.: 12/134,126

(22) Filed: Jun. 5, 2008

(65) Prior Publication Data
US 2009/0307238 A1 Dec. 10, 2009

(51) Int. Cl.
G06F 17/00 (2006.01)
G06F 17/30 (2006.01)
G06Q 30/02 (2012.01)

(52) U.S. Cl.
CPC ............. *G06Q 30/02* (2013.01); *G06F 17/30* (2013.01)
USPC ............ 707/688; 707/736; 707/749; 707/758

(58) Field of Classification Search
CPC .................................. G06F 17/00; G06F 17/30
USPC ......... 707/609, 687, 694, 695–700, 705–711, 707/723–731, 747–753, 755, 776–777, 688, 707/736, 758; 706/45–50; 715/205–209, 715/233–235
See application file for complete search history.

(56) References Cited

U.S. PATENT DOCUMENTS

| | | | |
|---|---|---|---|
| 6,434,745 B1 * | 8/2002 | Conley et al. | 717/177 |
| 6,487,555 B1 * | 11/2002 | Bharat et al. | 1/1 |
| 6,505,195 B1 * | 1/2003 | Ikeda et al. | 1/1 |
| 2002/0095298 A1 | 7/2002 | Ewing | |
| 2002/0116276 A1 | 8/2002 | Ottley | |
| 2003/0069880 A1 * | 4/2003 | Harrison et al. | 707/3 |
| 2005/0149507 A1 * | 7/2005 | Nye | 707/3 |
| 2005/0234953 A1 * | 10/2005 | Zhang et al. | 707/101 |
| 2006/0195297 A1 * | 8/2006 | Kubota et al. | 702/187 |
| 2007/0162414 A1 * | 7/2007 | Horowitz et al. | 707/1 |
| 2008/0010683 A1 * | 1/2008 | Baddour et al. | 726/24 |
| 2008/0215563 A1 * | 9/2008 | Shi et al. | 707/5 |

OTHER PUBLICATIONS

Wensi Xi, Edward A. Fox, et al. "SimFusion: Measuring Similarity using Unified Relationship Matrix", SIGIR'05, Aug. 15-19, 2005, 8 pages.*
Xinyi Yin et al. "Towards Understanding the Functions of Web Element", Springer-Verlag Berlin Heidelberg 2005, pp. 313-324.*
PCT/US/2008/080754 search report, Jan. 2, 2009, Tommy V. Sanguinetti.

* cited by examiner

*Primary Examiner* — Srirama Channavajjala
(74) *Attorney, Agent, or Firm* — P&T Law APC

(57) ABSTRACT

A method and system classifies a venue by analyzing venue data from a venue website. The method includes receiving preliminary venue-related data. The method includes scanning the venue website to retrieve venue data, wherein scanning the venue website includes retrieving the venue data from HTML pages, text documents, PDF documents, and images. The method includes retrieving verifiable venue data from the venue data. The verifiable venue data is a subset of the venue data. The method includes analyzing the verifiable venue data by comparing the verifiable venue data to the preliminary venue-related data and determining a probability level for the venue URL from the comparison. If the probability level for the venue URL is equal or greater than a first probability level, the venue website data is further analyzed to extract attributes and attribute counts in a robust and context-sensitive way. The method includes determining the percentage of the attribute representation from the total number of preselected attributes in the venue data and classifying the venue based on the percentage of the attribute representation.

24 Claims, 3 Drawing Sheets

METHOD AND SYSTEM FOR CLASSIFICATION OF VENUE BY ANALYZING DATA FROM VENUE WEBSITE

FIELD OF THE INVENTION

The invention relates to data analysis, and more particularly the invention relates to a method and system for classification of a venue by analyzing data from a venue website.

BACKGROUND OF THE INVENTION

Due to the increasing amount of information available on the Internet, there is a need for accurate extraction and analysis of information from websites. In particular, when extracting information relating to venues from venue websites some existing methods perform full text searches on the actual words on the website. Other existing methods simply classify the venues in broad terms and do not intelligently extract details and context of the information available on the website.

Typically existing methods require parsing a large amount of data in order to rank parsed results according to page popularity. Also, existing methods typically count occurrences of individual words found on websites, without considering synonyms of individual words, and typically do not consider similarities of parsed words, as encountered across parsed websites. Moreover, existing methods typically perform searches strictly by character matching, so a search for "beef" would not necessarily yield results with "steak." Accordingly, there is a need for a more intelligent method and system for analysis of venue website information.

SUMMARY

A method and system classifies a venue by analyzing venue data from a venue website. The method includes receiving preliminary venue-related data. The preliminary-venue related data includes a venue URL. The method includes scanning the venue website to retrieve venue data, wherein scanning the venue website includes retrieving the venue data from HTML pages, text documents, PDF documents and images. The method includes retrieving verifiable venue data from the venue data. The verifiable venue data is a subset of the venue data.

The method includes analyzing the verifiable venue data by comparing the verifiable venue data to the preliminary venue-related data and determining a probability level for the venue URL from the comparison. If the probability level for the venue URL is equal or greater than a first probability level, the venue website data is further analyzed to extract attributes and attribute counts in a robust and context-sensitive way. The method includes determining the percentage of the attribute representation from the total number of preselected attributes in the venue data and classifying the venue based on the percentage of the attribute representation.

The method includes determining attribute distance association by identifying correlation of attributes and quantifying attribute similarities from the attribute distance association. The method includes comparing the classified venue to other venues based on quantified attribute similarities. The method includes comparing selected verifiable venue data to corresponding preliminary venue-related data and determining if the selected verifiable venue data is different from the corresponding preliminary venue-related data. The method includes assigning a probability level lower than the first probability level if the selected verifiable venue data is different from the corresponding preliminary venue-related data.

DETAILED DESCRIPTION OF THE INVENTION

In one example implementation, a method and system classifies a venue by analyzing venue data from a venue website. The venue may be a restaurant, a club, a bar, a hotel or any other establishment. In one implementation, the venue is classified by analyzing attributes present in the venue data.

In accordance with one embodiment, a venue may be classified based on certain attributes found in the website. Also, based on certain attributes in the venue website, other attributes that are typically relevant to the attributes found in the venue website may be inferred. In one embodiment, if certain words are synonyms of each other, and the fancy or elegant version of the word is used on the venue website, the venue may be classified appropriately such as for example as an upscale restaurant. Thus, based on the words found on the venue website, a classification of the venue may be made. For example, the word "appetizer" is a synonym of the word "hors'deurves." If the word "hors'deurves" is used rather than its synonym "appetizer", it may be reasonable to classify the venue as being an upscale restaurant. On the other hand, if the word "appetizer" is used, it may be reasonable to classify the venue as being casual.

In many instances, the presence of certain words on a menu or on the website may provide information about the atmosphere of the venue. For example, if a menu lists "filet mignon" or a fancy dessert as an item, it may be reasonable to classify the venue as a high-end restaurant, and thus auto-add other relevant attributes generally associated with high-end restaurants.

In one embodiment, certain selected words found on the website are assigned with a classifier factor. For example, items on a menu may be assigned a "fanciness factor", words on the website may be assigned a "theme factor", and activities may be assigned a "formal factor", etc. In one embodiment, the words and attributes are analyzed based on the assigned classifier factors, including the proximity of certain attributes to each other.

Figure 1:
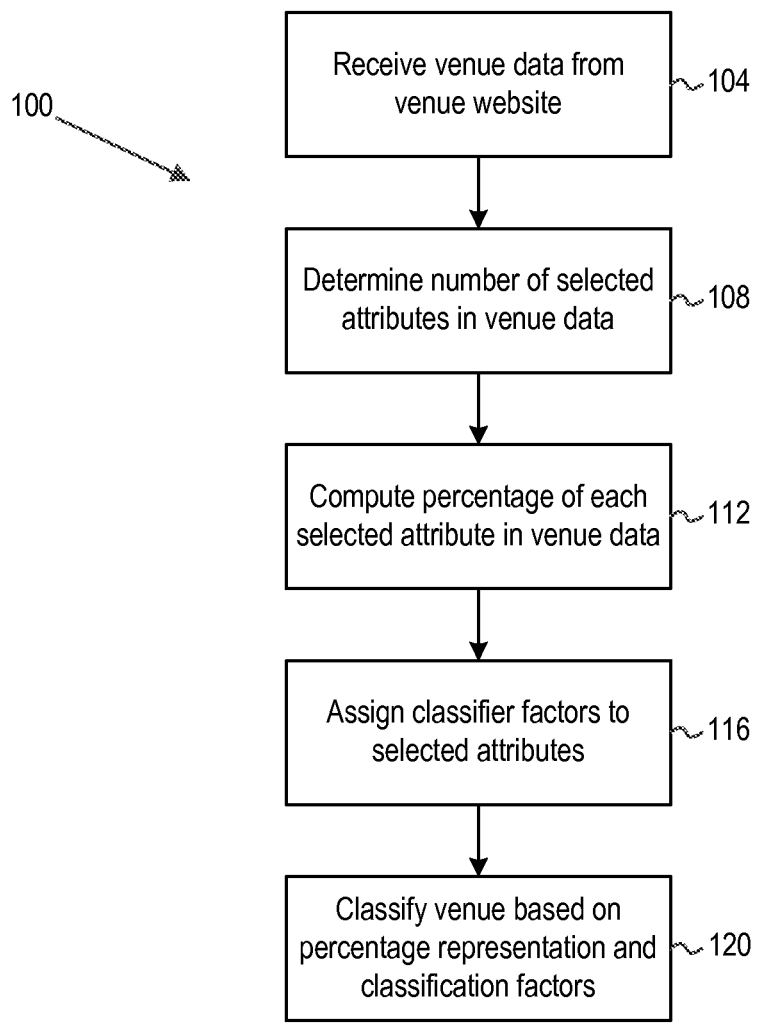
FIG. 1 is a flow diagram of a method for classifying a venue in accordance with one embodiment.

FIG. 1 is a flow diagram 100 of classifying a venue in accordance with one embodiment. In step 104, venue data is received from a venue website. The venue data can be retrieved by scanning data from a venue's website, including HTML pages, text documents, PDF documents, images, or any other media files. In one embodiment, the venue data may be derived from Flash, Silverlight, videos and other multimedia formats. In one embodiment, optical character recognition techniques, used to recognize text contained within images, may be used to read words from images to collect venue data. Other image classification techniques may be used to collect the venue data as well.

In one implementation, pages of a venue website are visited by a parser. Content (venue data) found on pages of the venue website is analyzed.

In step 108, the number of selected attributes in the venue data is determined. The selected attributes may be identified by the words or their synonyms or related words in the venue data. The count of attribute occurrences (or their synonyms/determined related words) is tallied for the venue data. Attributes may be deduced from the venue data collected from a set of venue websites based on or specified a priori by any other method of compilation.

For example, consider the following venue data: "Join us for some of America's favorites, including filet mignon, New York strip steak, Australian rack of lamb, veal chops, and Australian lobster tail."

Consider the following attribute set, with synonyms in parenthesis: [American (America), Beef (filet mignon, steak, veal), Chicken (buffalo wings, hot wings), Lamb (mutton), Seafood (fish, lobster, clams, scallops), Pork (ham, bacon, spam)]

The resulting tallies might be:

| | |
|---|---|
| American: | 1 |
| Beef: | 3 |
| Chicken: | 0 |
| Lamb: | 1 |
| Seafood: | 1 |
| Pork: | 0 |

In step 112, the percentage of each selected attribute in the venue data is determined. Consider the following resulting attribute tallies:

| | |
|---|---|
| Beef: | 4 |
| Chicken: | 3 |
| Handicap Accessible: | 2 |
| Pork: | 1 |
| Total sum: | 10 |

When calculating percentages, the system may consider factors other than strict tallies, such as a predetermined "Importance" factor for each attribute. Suppose the following Importance factors exist (0-1 scale):

| | |
|---|---|
| Beef: | 0.9 |
| Chicken: | 0.9 |
| Handicap Accessible: | 0.1 |
| Pork: | 0.9 |

Weighted Total sum: 4*0.9+3*0.9+2*0.1+1*0.9=7.4
The resulting percentages would be:

| | |
|---|---|
| Beef: | 4 * 0.9/7.4 = 49% |
| Chicken: | 3 * 0.9/7.4 = 36% |
| Handicap Accessible: | 2 * 0.1/7.4 = 3% |
| Pork: | 1 * 0.9/7.4 = 12% |

These percentages are compared to statistics across the venue data set to determine a relative attribute prominence. For example, suppose the following statistics are calculated based on percentages of attribute occurrence (among venues for which the attribute is present) across the venue data set:

| Attribute | AVG | STD DEV |
|---|---|---|
| Beef: | 21% | 7% |
| Chicken: | 17% | 10% |
| Handicap Accessible: | 2% | 2% |
| Pork: | 15% | 4% |

The resulting attribute prominence weights (0-1 scale) may be:

| | |
|---|---|
| Beef: | 0.95 |
| Chicken: | 0.65 |
| Handicap Accessible: | 0.55 |
| Pork: | 0.40 |

In step 116, the selected attributes in the venue data are each assigned a classifier factor. For example, attribute prestige factors may be determined based on frequency of expensive venues that have a particular subset/synonym of an attribute, versus the frequency of less expensive venues that feature a particular attribute. E.g. Filet mignon; $: 0.05, $$: 0.15, $$$: 0.50, $$$$: 0.70. Other classifier factors may be assigned.

In step 120, the venue is classified based on the percentage of each attribute representation and the classifier factor.

Figure 2:
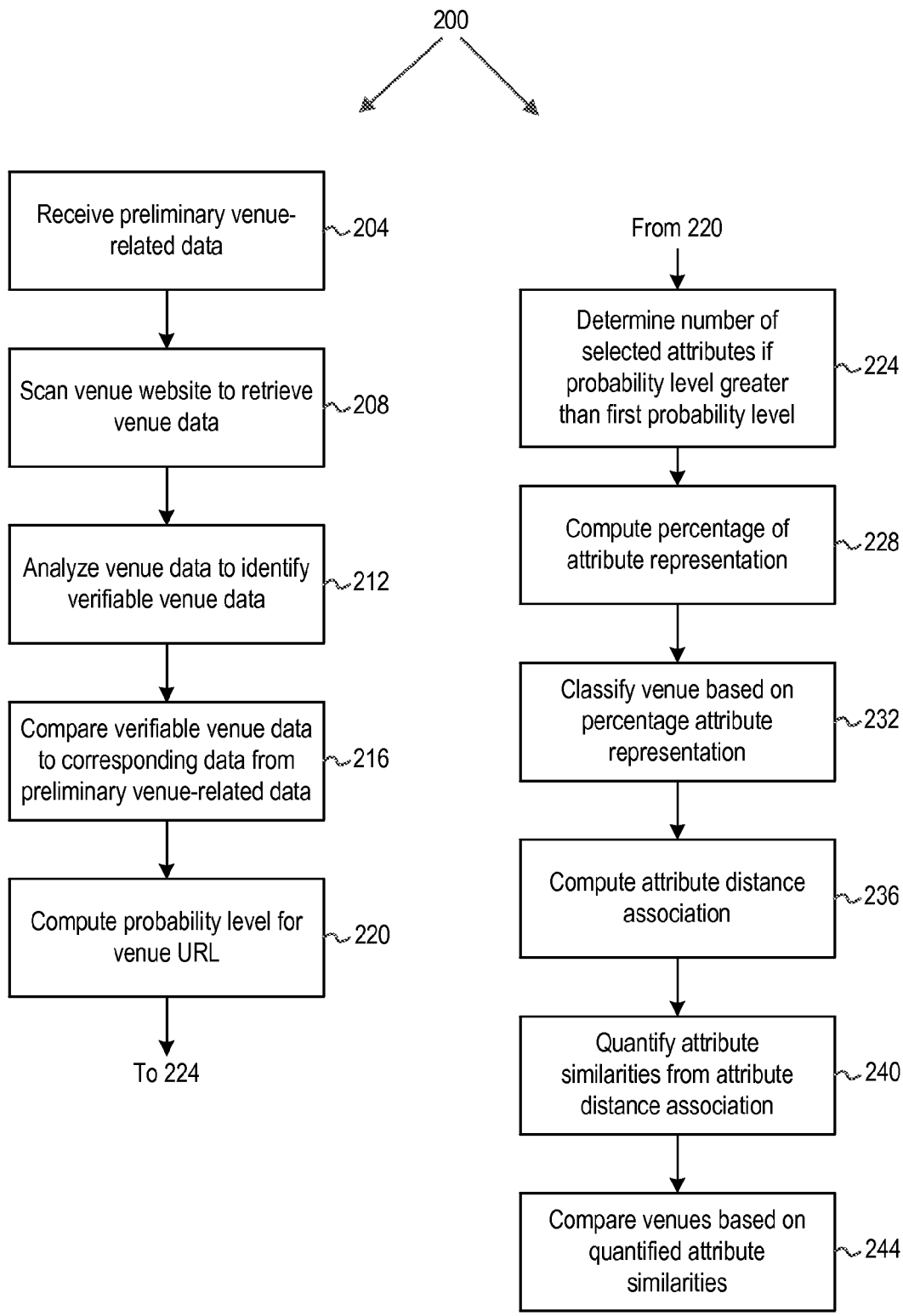
FIG. 2 is a flow diagram of a method for classifying a venue in accordance with another embodiment.

FIG. 2 is a flow diagram 200 of a method for classifying a venue by analyzing venue data from a venue website, in accordance with another embodiment. In step 204, preliminary venue-related data is received. The preliminary venue-related data may be a venue URL, a venue address, a venue phone number, etc. In step 208, the venue website is scanned to retrieve venue data. As discussed before, the venue data can be retrieved by scanning data from HTML pages, text documents, PDF documents and images found in the venue website.

In step 212, the venue data is analyzed to identify verifiable venue data. The verifiable venue data is a subset of the venue data that may be helpful in verifying the venue. For example, the venue address, the venue phone number and other important data may be considered verifiable venue data helpful in the verification of the venue. In step 216, the verifiable venue data is compared to the corresponding data from the preliminary venue-related data. In other words, certain data scanned from the venue is compared to the preliminary data received in order to verify that the correct venue is being analyzed. In step 220, a probability level or certainty level for the venue URL is determined. In one embodiment, based on the results of the comparison in step 216, a venue is assigned a numerical score representing the probability factor. For example consider a scenario where the venue address and venue name derived from scanning matches corresponding data from the preliminary venue-related data, but the venue phone number does not match. Consequently, the particular venue may be assigned a probability factor of 0.67.

In step 224, the calculated probability level is compared to a predetermined probability level (e.g., first probability level). If the calculated probability level is equal or greater than the first probability level, the number of selected attributes in the venue data is determined. For example, the venue data may be analyzed to determine the number of occurrences of the attributes "appetizers", "filet mignon", "crème brulee", etc. As discussed before, the venue data is also analyzed for synonyms or words related to the attributes.

In step 228, the percentage of the attribute representation from the total number of selected attributes in the venue data is determined. For example, the analysis may yield the following results: 30% steak, 25% chicken, 15% American, etc. In step 232, the venue is classified based on the percentage of the attribute representation. For example, if the percentage representation of the attribute "bar-be-que" is 55%, it may be reasonable to classify the venue as a bar-be-que restaurant. Also, if the analysis of the venue data reveals lack of the attributes "beef", "steak", "chicken", "pork", "fish" or their synonyms, it may be reasonable to classify the restaurant as a vegetarian restaurant.

In step 236, an attribute distance association is determined by identifying correlation of attributes. For example, an attribute distance (correlation) matrix may be computed based on frequency of co-occurrence of attribute pairs within the venue data set. Suppose 25% of venues that have Chicken or Beef have both. Suppose 50% of venues that have Pasta or Italian have both. Suppose 67% of venues that have Taco or Burrito have both.

In step 240, attribute similarities are quantified from the attribute distance association. Given a function X that converts correlation statistics to attribute similarities (0-1), the following may be computed:

| Attribute Pair | Similarity |
|---|---|
| Chicken, Beef | 0.30 |
| Pasta, Italian | 0.65 |
| Taco, Burrito | 0.80 |

In step 244, the venue is compared to other venues based on the quantified attribute similarities. As explained before, an attribute-to-attribute comparison is performed, as well as an attribute-to- (related by similarity) attribute comparison, with overlap tallied. For example, an analysis may yield that the attributes "Moroccan" and "Greek" are 45% similar based on co-occurrences within the venue pool. Likewise, it may be determined that "Burrito" and "Taco" are 60% similar, and that they highly correlate with "Mexican." These distance association may then be used to improve searches and general venue comparisons. For example, even with limited data, if there is only one Moroccan restaurant in a city, a search for similar venues may yield a nearby Greek restaurant, since the attributes "Moroccan" and "Greek" are somewhat similar, based on their correlation.

Consider for example, two venues are being compared, each venue being described by a set of attributes and "classifier factors".

Venue 1: {Italian: 0.4, Chicken: 0.5, Salad: 0.25}
Venue 2: {Greek: 0.7, Kabobs: 0.4, Appetizers: 0.2}

A general weighted venue-to-venue attribute comparison would yield a score of zero in this case. However, if there is a set of Attribute Distance Associations defined as {Italian→Greek: 0.3, Chicken→Kabobs: 0.5, Salad→Appetizers: 0.4}, the comparison may yield a significantly improved score. As example, Italian→Greek overlap*0.3+Chicken→Kabobs overlap*0.5+Salad→Appetizers overlap*0.4=0.18+0.22+0.09=0.49 (raw score, non-normalized.)

In one embodiment, if the probability level discussed before is equal or greater than the first probability level, the venue data may be analyzed for general information, such as operating hours, events, happy hours, specials, etc. The venue data may be analyzed to identify menus based on known characteristics, including currency indicators to collect pricing data. Additional information may be deduced such as the venue atmosphere based on factors such as the Flesh-Kincaid Grade Level and readability scores, descriptions and synonyms used (e.g., filet mignon, free range chicken, wild Alaskan Salmon, Australian rack of lamb, etc.). For example, venue data containing a Flesh-Kincaid Grade Level of 18 (the 18th grade), coupled with attribute synonyms with high prestige factors may be indicative of a Fine Dining atmosphere.

Figure 3:
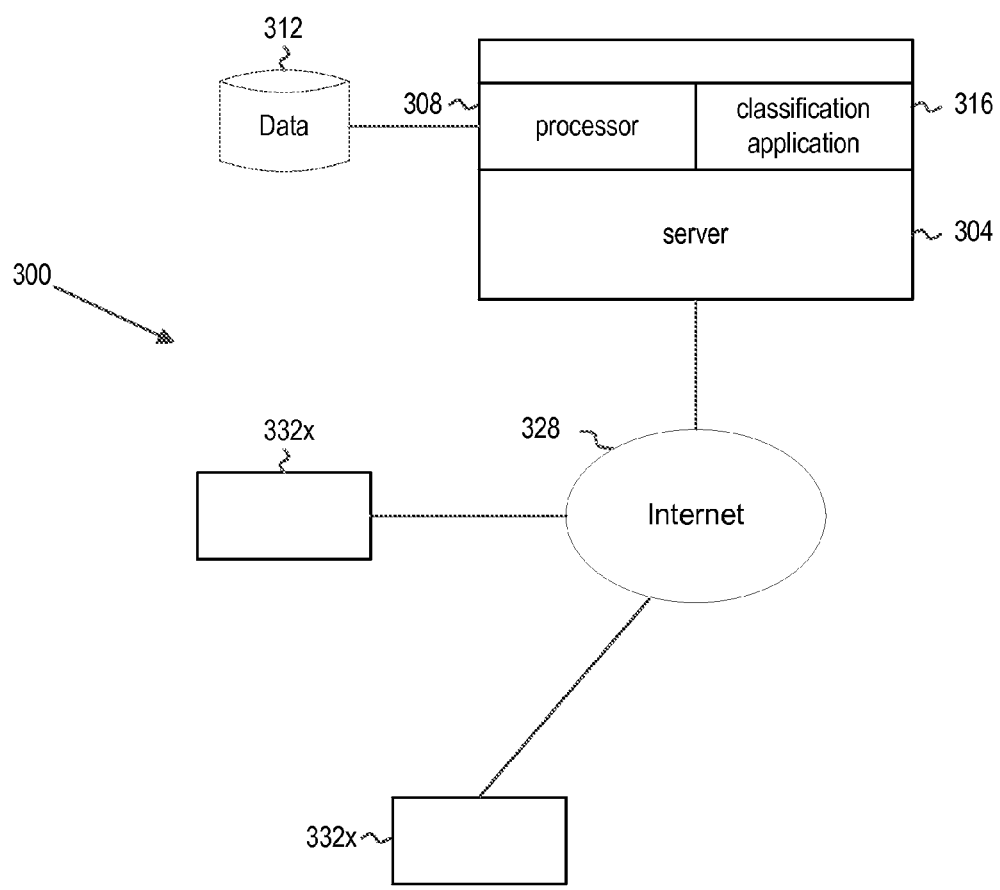
FIG. 3 is a system for implementing an example embodiment including at least portions of the disclosed embodiments.

FIG. 3 is a system 300 that may be used to implement an example embodiment of the invention including at least portions of the disclosed embodiments. The system 300 includes a server 304 including a central processing unit (CPU) 308. The server 304 is connected to a database 312 or any other data storage system. A venue classification application 316 may reside in the server 304. The venue classification application 316 may be a software application or a routine configured to classify a venue by analyzing venue data from a venue website. The CPU 308 executes the application 316 to process data. The server 304 is connected to the Internet 328. The server 304 may access venue websites 332*x*, scan venue data from the venue websites 332*x*, and classify venues based on the processes discussed before. The venue data may be stored in the database 312.

In one example implementation, a software application embodying a computer program code may be configured to classify a venue by analyzing venue data from a venue website. In one implementation, the steps of the methods described above may be executed by one or more computer readable codes embodied in a computer readable medium such as a computer program product. The computer program product may be a CD, a floppy disk, an optical disk, a hard drive or any other storage system.

The venue classification method and system in accordance with embodiments described before provides various advantages. The venue classification may be used to target only websites of interest to be parsed and adds uniformity to venue representations. The venue classification provides varying levels of detail for comparisons, and results are effectively indexed by "meaning", so a search for "beef" may also return results with "steak." The venue classification also provides context checking (e.g., out of context possibilities, context-safe attributes). The venue classification enables parsing a set of target websites to deduce attributes, based on the merging of synonyms, and ultimately a frequency analysis.

The system, method, and computer program product described in this application may, of course, be embodied in hardware; e.g., within or coupled to a Central Processing Unit ("CPU"), microprocessor, microcontroller, System on Chip ("SOC"), or any other programmable device. Additionally, the system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, and the like. The routines can operate in an operating system environment or as stand-alone routines occupying all, or a substantial part, of the system processing.

Embodiments of the invention may be implemented by using a general purpose digital computer, software applications, routines and software modules, hardware including application specific integrated circuits, programmable logic devices, field programmable gate arrays, optical and other mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one implementation", "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the implementations or embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A method for classifying a venue by analyzing venue data from a venue website, comprising:
   receiving preliminary venue-related data including a venue URL;
   scanning the venue website to retrieve venue data;
   retrieving verifiable venue data from the venue data, the verifiable venue data being a subset of the venue data;
   analyzing, using a computer, the verifiable venue data by comparing the verifiable venue data to the preliminary venue-related data;
   determining a probability level for the venue URL from the comparison;
   if the probability level for the venue URL is equal or greater than a first probability level, determining the number of selected attributes in the venue data;
   determining the percentage of the attribute representation from the total number of preselected attributes in the venue data; and
   classifying the venue based on the percentage of the attribute representation.

2. The method of claim 1, further comprising:
   determining attribute distance association by identifying correlation of attributes;
   quantifying attribute similarities from the attribute distance association;
   comparing the classified venue to other venues based on quantified attribute similarities.

3. The method of claim 1, further comprising:
   classifying the atmosphere of the venue based on the attributes.

4. The method of claim 1, wherein the classification of the venue further comprises:
   assigning a classifier factor for each selected attribute in the venue data;
   classifying the venue from the assigned classifier factors, wherein the classifier factor is an activity factor.

5. A computer-implemented method for determining attributes of a venue, the method comprising steps to:
   analyze first data associated with a first venue to identify a first set of venue attributes associated with the first venue;
   analyze second data associated with a second venue to identify a second set of venue attributes associated with the second venue;
   compare, using a computing device, the first set of venue attributes with the second set of venue attributes; and
   determine, based on comparing the first set and the second set, a level of similarity between the first venue and the second venue.

6. The method of claim 5, wherein one or more venue attributes of the first set are identified based on an existence of synonymous words in the first data.

7. The method of claim 5, the method further comprising steps to:
   determine a first number of occurrences that a first venue attribute of the first set appears in the data.

8. The method of claim 7, wherein the first number of occurrences includes occurrences of a first word and a second word in the data, wherein the first word and the second word have synonymous meanings.

9. The method of claim 7, the method further comprising steps to:
   determine, for each remaining venue attribute of the first set, a respective number of occurrences that the respective venue attribute appears in the data.

10. The method of claim 9, the method further comprising steps to:
    sum the first number of occurrences with each of the respective number of occurrences to achieve a total number of occurrences;
    determine a first ratio between the first number of occurrences and the total number of occurrences; and
    determine a relative attribute prominence for the first venue attribute based on the first ratio and other data associated with other venues.

11. The method of claim 5, the method further comprising steps to:
    determine a first inferred attribute of the venue based on the data, wherein the venue attributes include the first inferred attribute.

12. The method of claim 11, the method further comprising steps to:
    determine the first inferred attribute based on an existence of a first venue attribute and a second venue attribute in the first set of venue attributes.

13. The method of claim 12, the method further comprising steps to:
    determine the first inferred attribute based on a comparison between a first number of occurrences of the first venue attribute in the data and a second number of occurrences of the second venue attribute in the data.

14. The method of claim 11, the method further comprising steps to:
    determine the first inferred attribute based on there not being a particular venue attribute among the first set of venue attributes.

15. The method of claim 11, the method further comprising steps to:
    determine the first inferred attribute based on an existence, in the data, of a first word from among a group of synonymous words.

16. The method of claim 15, wherein the first word is a fancy or elegant word compared to other synonymous words in the group, and wherein the first inferred attribute indicates that the venue is high-end or upscale compared to other venues.

17. The method of claim 15, the method further comprising steps to:
    determine a different inferred attribute for a different venue based on an existence, in different data associated with the different venue, of a second word from among the group of synonymous words.

18. The method of claim 5, the method further comprising steps to:
    identify a first venue attribute from the first set of venue attributes;
    determine an attribute distance association related to a co-occurrence of the first venue attribute and a different venue attribute in other data associated with other venues.

19. The method of claim 18, the method further comprising steps to:
    identify one or more venues from the other venues that are associated with the different venue attribute; and
    determine levels of similarity between the first venue and the one or more venues based on the attribute distance association relating to the first venue attribute and the different venue attribute.

20. The method of claim 5, the method further comprising steps to:

analyze other data associated with other venues to determine possible attributes from which the venue attributes are identified.

21. A system for determining attributes of a venue, the system comprising one or more processors that are operable to:
  analyze first data associated with a first venue to identify a first set of venue attributes associated with the first venue;
  analyze second data associated with a second venue to identify a second set of venue attributes associated with the second venue;
  compare, using a computing device, the first set of venue attributes with the second set of venue attributes; and
  determine, based on comparing the first set and the second set, a level of similarity between the first venue and the second venue.

22. The system of claim 21, wherein the one or more processors are further operable to:
  determine a first number of occurrences that a first venue attribute of the first set appears in the data, wherein the first number of occurrences includes occurrences of a first word and a second word in the data, wherein the first word and the second word have synonymous meanings;
  determine, for each remaining venue attribute of the first set, a respective number of occurrences that the respective venue attribute appears in the data;
  sum the first number of occurrences with each of the respective number of occurrences to achieve a total number of occurrences;
  determine a first ratio between the first number of occurrences and the total number of occurrences;
  determine a relative attribute prominence for the first venue attribute based on the first ratio and other data associated with other venues;
  determine a first inferred attribute of the venue based on the data, wherein the venue attributes include the first inferred attribute;
  determine the first inferred attribute based on an existence of a first venue attribute and a second venue attribute in the first set of venue attributes;
  determine the first inferred attribute based on a comparison between a first number of occurrences of the first venue attribute in the data and a second number of occurrences of the second venue attribute in the data;
  identify a first venue attribute from the first set of venue attributes;
  determine an attribute distance association related to a co-occurrence of the first venue attribute and a different venue attribute in other data associated with other venues;
  identify one or more venues from the other venues that are associated with the different venue attribute; and
  determine levels of similarity between the first venue and the one or more venues based on the attribute distance association relating to the first venue attribute and the different venue attribute.

23. A computer program product comprising a non-transitory computer usable medium having a computer readable program code embodied therein, said computer readable program code adapted to be executed to implement a method for determining attributes of a venue, the method comprising steps to:
  analyze first data associated with a first venue to identify a first set of venue attributes associated with the first venue;
  analyze second data associated with a second venue to identify a second set of venue attributes associated with the second venue;
  compare, using a computing device, the first set of venue attributes with the second set of venue attributes; and
  determine, based on comparing the first set and the second set, a level of similarity between the first venue and the second venue.

24. The computer program product of claim 23, the method further comprising steps to:
  determine a first number of occurrences that a first venue attribute of the first set appears in the data, wherein the first number of occurrences includes occurrences of a first word and a second word in the data, wherein the first word and the second word have synonymous meanings;
  determine, for each remaining venue attribute of the first set, a respective number of occurrences that the respective venue attribute appears in the data;
  sum the first number of occurrences with each of the respective number of occurrences to achieve a total number of occurrences;
  determine a first ratio between the first number of occurrences and the total number of occurrences;
  determine a relative attribute prominence for the first venue attribute based on the first ratio and other data associated with other venues;
  determine a first inferred attribute of the venue based on the data, wherein the venue attributes include the first inferred attribute;
  determine the first inferred attribute based on an existence of a first venue attribute and a second venue attribute in the first set of venue attributes;
  determine the first inferred attribute based on a comparison between a first number of occurrences of the first venue attribute in the data and a second number of occurrences of the second venue attribute in the data;
  identify a first venue attribute from the first set of venue attributes;
  determine an attribute distance association related to a co-occurrence of the first venue attribute and a different venue attribute in other data associated with other venues;
  identify one or more venues from the other venues that are associated with the different venue attribute; and
  determine levels of similarity between the first venue and the one or more venues based on the attribute distance association relating to the first venue attribute and the different venue attribute.

* * * * *